(12) United States Patent
Hu et al.

(10) Patent No.: US 7,384,504 B2
(45) Date of Patent: Jun. 10, 2008

(54) LIGHT-STABLE AND PROCESS-STABLE LIGNOCELLULOSIC MATERIALS AND THEIR PRODUCTION

(75) Inventors: Thomas Q. Hu, Vancouver (CA); Ivan I Pikulik, Pointe-Claire (CA); Trevor Williams, Richmond (CA)

(73) Assignee: FPInnovations, Pointe-Claire, Quebec (CA)

( * ) Notice: Subject to any disclaimer, the term of this patent is extended or adjusted under 35 U.S.C. 154(b) by 232 days.

(21) Appl. No.: 10/532,138

(22) PCT Filed: Oct. 21, 2003

(86) PCT No.: PCT/CA03/01606

§ 371 (c)(1),
(2), (4) Date: Apr. 20, 2005

(87) PCT Pub. No.: WO2004/038091

PCT Pub. Date: May 6, 2004

(65) Prior Publication Data

US 2005/0269049 A1 Dec. 8, 2005

(51) Int. Cl.
*D21C 3/20* (2006.01)
(52) U.S. Cl. .......................... 162/76; 162/74; 162/162; 162/72
(58) Field of Classification Search .................. None
See application file for complete search history.

(56) References Cited

U.S. PATENT DOCUMENTS

| 4,178,861 | A | 12/1979 | Vanderhoek et al. | |
|---|---|---|---|---|
| 5,318,851 | A | 6/1994 | Baron et al. | |
| 5,641,385 | A | 6/1997 | Croft et al. | |
| 6,200,938 | B1 | 3/2001 | Perella | |
| 6,254,724 | B1 | 7/2001 | Seltzer et al. | |
| 6,416,627 | B1 * | 7/2002 | Cunkle et al. | 162/168.5 |
| 6,447,644 | B1 | 9/2002 | Seltzer et al. | |
| 2002/0056534 | A1 | 5/2002 | Hu | |
| 2002/0124980 | A1 | 9/2002 | Heitner et al. | |

FOREIGN PATENT DOCUMENTS

| WO | WO 99/05108 | 2/1999 |
|---|---|---|
| WO | WO 99/23117 | 5/1999 |
| WO | WO 02/25007 | 3/2002 |

OTHER PUBLICATIONS

Chemical Abstracts Service Abstract No. 2001:208339.*
"Application of Yellowing Inhibitors to Mechanical Papers Using a Pilot Liquid Application System", by Z. Yuan et al, Journal of Pulp and Paper Science: vol. 28 No. 5 May 2002, pp. 159-166.
"Advanced Organic Chemistry—Reactions, Mechanisms and Structure", Third Edition, Jerry March, pp. 797-800.
"Reductive Animation of Aldehydes and Ketones with Sodium Triacetoxyborohydride. Studies on Direct and Indirect Reductive Animation Procedures" by A.F. Abdel-Magid et al, J. Org. Chem. 1996, 61,pp. 3849-3862.
"Formation of N-Hydroxy-amines of Spin Labeled Nucleosides for H-NMR Analysis", by A.J. Ozinskas et al, Helvetica Chimica Acta—vol. 63, Faxc. 6 (1980)—Nr. 148, pp. 1407-1411.
"A Study of the Favorskii Rearrangement with 3-Bromo-4-oxo-2,2,6,6-tetramethylpiperidin-1-oxyl" by G. Sosnovsky et al, J. Org. Chem. 1995, 60, pp. 3414-3418.
"Brightness of Pulp, Paper and Paperboard (Directional Reflectance at 457 nm", TAPPI Press 1996.
"Inhibition of Light-Induced Yellowing of Lignin-Containing Papers" by C. Heitner, American Chemical Society, pp. 192-204.

* cited by examiner

*Primary Examiner*—Philip C Tucker
*Assistant Examiner*—Michael J Felton
(74) *Attorney, Agent, or Firm*—Ogilvy Renault LLP

(57) ABSTRACT

A novel method for the production of light-stable and process-stable lignocellulosic materials, in particular, the production of mechanical wood pulps with much improved light and process stability is described, as well as the resulting pulps of improved light and process stability and papers containing such pulps. The novel method involves the reaction of lignocellulosic materials such as bleached chemithermomechanical pulps (BCTMP) with (a) a water-soluble, fibre-reactive yellowing inhibitor possessing two or more secondary amino or ammonium (—NHR' or —HN$^+$HR'), tertiary amino or ammonium (—NR'R" or —HN$^+$R'R"), and/or quaternary ammonium (—N$^+$R'R"R'") functional groups in an aqueous medium, or (b) a water-soluble, fibre-reactive hindered amine light stabilizer possessing said amino or ammonium functional groups in an alkaline peroxide bleaching medium or in an aqueous medium with a subsequent bleaching of the materials in an alkaline peroxide bleaching medium. Examples of the water-soluble, fibre-reactive yellowing inhibitors are the novel, N-(2,2,6,6-tetramethyl-1-oxyl-piperidin-4-yl)-N'-{2-[2-(2,2,6,6-tetramethyl-1-oxyl-piperidin-4-ylamino)-ethylamino]-ethyl}-ethane-1,2-diamine (abbreviated as TETA-2TEMPO) and its hydroxylamine hydrochloride derivative, N-(2,2,6,6-tetramethyl-1-hydroxyl-piperidin-4-yl)-N'-{2-[2-(2,2,6,6-tetramethyl-1-hydroxyl-piperidin-4-ylamino)-ethylamino]-ethyl}-ethane-1,2-diamine hexahydrochloride (abbreviated as TETA-2TEMPOH-6HCl).

24 Claims, No Drawings

LIGHT-STABLE AND PROCESS-STABLE LIGNOCELLULOSIC MATERIALS AND THEIR PRODUCTION

TECHNICAL FIELD

The current invention relates to the field of wood, pulp and paper production. More specifically, it relates to the production of light-stable and process-stable lignocellulosic materials, in particular, the production of mechanical wood pulps and papers made from such pulps with much improved light and process stability, as well as to the resulting pulps and papers having improved light and process stability.

BACKGROUND

Lignocellulosic materials such as wood are the raw materials used for the production of pulps and papers. In order to make papers, lignocellulosic materials such as wood are first reduced to pulps (discrete fibres) by a mechanical or chemical pulping process. In mechanical pulping, pulps such as the so-called thermomechanical pulp (TMP) and chemithermomechanical pulp (CTMP) are produced (with retention of lignin) mainly through the action of mechanical forces in a yield of $\geqq 90$. Following the pulping process, bleaching of the pulps to a whiter colour is often carried out prior to the process of papermaking. The whiteness of pulps and papers is commonly estimated by ISO (International Standardization Organization) brightness determination that measures the directional reflectance of light at 457 nm of the papers in an Elrepho instrument [*TAPPI Test Methods*, T452 om-92, Tappi Press: Atlanta, 1996]. A low ISO brightness such as 30% indicates deep brown papers and a high ISO brightness such as 85% represents white papers. Unbleached and bleached mechanical pulps typically have ISO brightness values of 45-65% and 70-85%, respectively, depending on the wood species, the pulping and bleaching conditions. The majority of lighin present in wood remains in unbleached and bleached mechanical pulps. This lignin reduces the pulp brightness at the time of its production and causes further brightness loss by a process referred to as colour reversion or yellowing when mechanical pulp or paper produced from mechanical pulp is exposed to light and/or heat. Colour reversion limits the application of mechanical pulps to products designed to have a short life such as newspaper while more lignin-free chemical pulps are used for long-life products in various grades.

Over the past fifty years or so, many methods have been reported for the inhibition of colour reversion of mechanical pulps and papers. These methods involve either a chemical treatment on pulps aimed at the modification of the yellowing-causing lignin or a surface treatment on papers made from mechanical pulps with yellowing inhibitors such as an UV absorber [Heitner, in: *Photochemistry of Lignocellulosic Materials*, ed. Heitner and Scaiano, p. 192-204, ACS Symposium Series 531, ACS 1993].

PCT, WO 99/05108, of Ciba Specialty Chemicals and published Feb. 4, 1999 and U.S. Pat. No. 6,254,724B1 issued to Ciba Specialty Chemicals on Jul. 3, 2001 describe the use of hindered nitroxide radicals, particularly derivatives of 4-hydroxy-2,2,6,6-tetramethylpiperidine-N-oxyl (4-hydroxy-TEMPO) as effective yellowing inhibitors alone or when combined with an UV absorber and other coadditives. All the examples provided in these publications involve syringe-injecting/spraying of an inhibitor solution to already-formed paper sheets, similar to other paper surface treatment methods reported elsewhere in the prior art. Although the descriptions are broad, indicating that the extremely broad class of inhibitors can be added to pulps, pulp slurries and papers, at all possible manufacturing stages, there is no teaching of how the inhibitors might be successfullly applied to pulp slurries and retained by the pulps. From these publications, it is not evident at all how the inhibitors, particularly those water-soluble ones, can be retained by pulp fibres on pulp slurries in aqueous media. The actual teachings are of coating the paper sheets with the inhibitors. It has recently been concluded that the inhibitor system based on hindered nitroxide radicals has no affinity for pulp fibres and thus must be applied to the surface of already-formed papers, in the press or dryer section of the paper machine, or on an off-line coater [Yuan et al., *J. Pulp Paper Sci.* 28(5:159-166, 2002].

U.S. Pat. No. 4,178,861 discloses a process for the delignification of lignocellulosic material which consists of pre-treating the material with a quinone or hydroquinone compound in a liquor consisting of an amine delignifying liquor, wherein the amine can be a polyalkylene polyamine such as triethylenetetramine. The amine is used as a base to remove lignin from the lignocellulosic material at elevated temperature (170° C.). U.S. Pat. No. 5,641,385 describes the use of ethyleneamines, including triethylenetetramine and other oligomers of ethylene amine to wash pulp to remove lignin. U.S. Pat. No. 6,200,938 B 1 discloses amphoteric derivatives of aliphatic polyamines such as triethylenetetramine with long chain fatty acids, esters or triglycerides as effective softening compositions for paper and other consumer and industrial products. None of the amines or amine derivatives described in these publications has any yellowing inhibitors or hindered amine light stabilizers attached to them. In addition, there is not any improvement on the light-stability of the lignocellulosic material treated with such amines or amine derivatives.

U.S. Pat. No. 5,318,851 describes epoxy resins containing bound, light-stabilizing groups. The hindered amine light stabilizer disclosed contains a hydrazido group (R—C(O) NR'—NHR") that allows the attachment of the light stabilizer to the epoxy resins. Epoxy resins have completely different chemical, physical and morphological properties than lignocellulosic materials.

U.S. Pat. No. 6,416,627 B1 issued to Ciba Specialty Chemicals on Jul. 9, 2002 discloses polymeric stabilizers with high affinity to pulp. Although the descriptions are broad, indicating that an extremely broad class of polymeric stabilizers with pendant hindered nitroxide, hydroxylamine or hydroxyl-ammonium salts can be added at various points in the paper-making process, there is no teaching of how the polymeric stabilizers might be successfully applied to pulp slurries containing various dispersed and/or dissolved components/chemicals, and be retained by the pulps. The actual teachings are of applying the inhibitors to paper sheets from an aqueous solution or from 1:1 ethanol/dioxane solution. In addition, no polymeric stabilizers with pendant hindered amine are described. This patent does not teach creating fibre-reactivity for the stabilizers by grafting them onto an oligomeric amine compound bearing multiple cationic charges.

U.S. Pat. No. 6,447,644 B1 issued to Ciba Specialty Chemicals on Sep. 10, 2002 describes inhibition of pulp and paper yellowing using nitroxides, hydroxylamines, and other coadditives such as UV absorbers. The composition of the claimed nitroxides and hydroxylamines includes those possessing one quaternary ammonium ($—N^+R_1R_2R_3$) group on the side-chain of the molecules. Compounds with a single positively charged group such as an ammonium group may form an ionic pair with the negatively charged sites of wood pulp fibres and might be retained on the fibres during the filtration of the fibrous suspension from deionized water. In papermaking, the fibrous suspension is dispersed in the so-called white water, which contains a considerable concentration of ions of elements such as calcium, magnesium, aluminum, or sodium. These mineral cations will compete with any compounds that contain a single positive charge and will cause their poor retention on the fibril.

PCT, WO 02/25007 A2 published on Mar. 28, 2002 describes a method for the production of light-stable lignocellulosic materials, in particular, the production of mechanical wood pulps with improved light stability, as well as the resulting pulps of improved light stability and papers containing such pulps. The method involves the reaction, in an aqueous medium, of the materials with a water-soluble, fibre-reactive yellowing inhibitor possessing a primary or secondary amino ($-NH_2$ or $-NHR$) functional group, or the reaction of a water-soluble, fibre-reactive, hindered amine light stabilizer possessing a primary or secondary amino ($-NH_2$ or $-NHR$) functional group in an alkaline peroxide bleaching medium or in an aqueous medium with a subsequent bleaching of the materials in an alkaline peroxide bleaching medium.

In the process of papermaking, pulps such as bleached mechanical pulps are first mixed with various papermaking additives and water to form pulp slurry called a furnish or a stock. The water used to form the pulp slurry consists of fresh water and circulating process water (also called white water). Fresh water and particularly white water may contain various dispersed components/chemicals such as particulate fibrous particles (also called fines) or calcium carbonate ($CaCO_3$) and dissolved components/chemicals such as calcium ions ($Ca^{2+}$). The high concentration of dissolved components/chemicals can cause detachment of additives that are originally bound to the pulp fibres. It is important that any yellowing inhibitors attached to mechanical pulps will be stable and remain attached to the pulps during pulp processing and papermaking in an aqueous medium containing various dispersed and/or dissolved components/chemicals, and in particular multivalent ions such as $Ca^{2+}$.

Reductive amination of aldehydes or ketones with ammonia, primary or secondary amines, i.e. reductive alkylation of ammonia, primary or secondary amines with aldehydes or ketones, in the presence of hydrogen and a hydrogenation catalyst, is an economical and effective way to obtain simple amino compounds [March, in: *Advanced Organic Chemistry*, John Wiley & Sons: New York, p. 798-800, 1985]. Sodium triacetoxyborohydride has also been used in the laboratory to affect the reductive amination [Abdel-Magid, et al., *J. Org. Chem.* 61: 3849-3862, 1996].

Hindered nitroxide (>N—O.) compounds such as 4-oxo-2,2,6,6-tetramethylpiperidine-N-oxyl (4-oxo-TEMPO) and 4-amino-2,2,6,6-tetramethylpiperidine-N-oxyl (4-amino-TEMPO) have deep orange colour and are paramagnetic due to the presence of the nitroxide radical. Proton nuclear magnetic resonance ($^1H$ NMR) characterization of hindered nitroxide compounds is done by reduction of the nitroxide to its diamagnetic, hydroxylamine (>N—OH) derivative with a reducing agent such as sodium dithionite [Ozinskas and Bobst, *Helv. Chim. Aata* 63: 1407-1411, 1980] or by conversion of the nitroxide to its diamagnetic, hydroxylamine hydrochloride (>N$^+$(H)OHCl$^-$) derivative with aqueous hydrochloric acid in ethanol [Sosnovsky and Cai, *J. Org. Chem.* 60: 3414-3418, 1995]. Conversion of the nitroxide to its hydroxylamine or hydroxylamine hydrochloride derivative also removes its orange colour.

DISCLOSURE OF THE INVENTION

In accordance with the invention there is provided a novel method for the production of light-stable and process-stable lignocellulosic materials, in particular, for the production of mechanical pulps with much improved light and process stability, as well as the resulting pulps of improved light and process stability and light-stable papers containing such pulps. The novel method involves the reaction of lignocellulosic materials with (a) a water-soluble, fibre-reactive yellowing inhibitor possessing two or more secondary amino or ammonium ($-NHR'$ or $-HN^+HR'$), tertiary amino or ammonium ($-NR'R''$ or $-HN^+R'R''$), and/or quaternary ammonium ($-N^+R'R''R'''$) functional groups in an aqueous medium, or (b) a water-soluble, fibre-reactive hindered amine light stabilizer possessing said amino or ammonium functional groups in an alkaline peroxide bleaching medium or in an aqueous medium with a subsequent bleaching of the materials in an alkaline peroxide bleaching medium.

This invention thus seeks to provide an improved method for the production of light-stable and process-stable lignocellulosic materials.

The invention also seeks to provide novel lignocellulosic materials obtainable by the improved method of the invention.

The invention further seeks to provide a paper containing the novel lignocellulosic materials of the invention.

In accordance with the present invention, there is provided a novel method for the production of light-stable and process-stable lignocellulosic materials such as mechanical wood pulps comprising the reaction of these materials in an aqueous medium, in an alkaline peroxide bleaching medium, or in an aqueous medium with a subsequent bleaching of the materials in an alkaline peroxide bleaching medium, with a water-soluble, yellowing inhibitor or hindered amine light stabilizer possessing two or more secondary and/or tertiary amino or ammonium, and/or quaternary ammonium groups of the general formula (O):

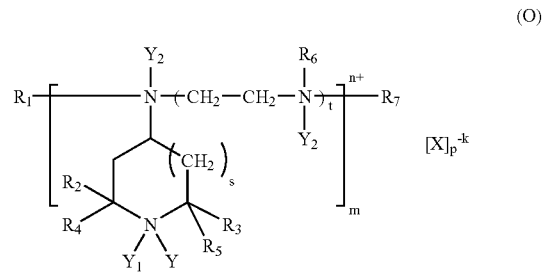

(O)

wherein s is 0 or 1;

k is an integer of 1 to 5, n is an integer of 0 to 5002, more preferably 0 to 502, even more preferably 0 to 52, and most preferably 0 to 12;

m is an integer of 1 to 5, t is an integer of 1 or more, preferably 1 to 5000, more preferably 1 to 500, even more preferably 1 to 50, and most preferably 1 to 10;

p is an integer of 0 to 5002, more preferably 0 to 502, even more preferably 0 to 52, and most preferably 0 to 12; provided that when n is 0, p is 0, m is 1, and both $Y_1$ and $Y_2$ are absent;

Y is oxyl (O), hydroxyl (OH) or hydrogen (H), and $Y_1$ is hydrogen or absent, provided that when $Y_1$ is hydrogen, Y is hydroxyl;

$Y_2$ is hydrogen or is absent, provided that when $Y_2$ is hydrogen, $n=t+1$ or $t+2$, and when $Y_2$ is absent, n is 0 or 1

$R_2$, $R_3$, $R_4$ and $R_5$ are independently alkyl groups $(CH_2)_jH$ unsubstituted or substituted by 1 to a $(2j+1)$ number of substituents, selected from hydroxyl, mercapto, lower alkoxy, lower alkylthio, benzyl, amino, lower alkyl ester, amide, carboxyl and carboxylate groups, or a radical derived from an organic ultraviolet absorber such as 2,4-dihydroxybenzophenone or 2-(2-hydroxyphenyl)benzotriazole; and being uninterrupted or interrupted by 1 to j number of heteroatoms selected from —O— and —S—, wherein j is 1 to 14, preferably 1 to 6, and more preferably 1 to 4;

$R_1$ is hydrogen or an ethylene amino or ammonium group of formula (I) or (J); when $t \geq 2$, $R_6$ and $R_7$ are independently hydrogen, a radical (functional group) derived from an organic ultraviolet absorber such as 2,4-dihydroxybenzophenone or 2-(2-hydroxyphenyl)benzotriazole, or a radical (functional group) of the formula (K), (L), (M) or (N);

when $t=1$, $R_6$ is hydrogen and $R_7$ is a radical (functional group) derived from an organic ultraviolet absorber such as 2,4-dihydroxybenzophenone or 2-(2-hydroxyphenyl)benzotriazole, or a radical (functional group) of the formula (K), (L), (M) or (N):

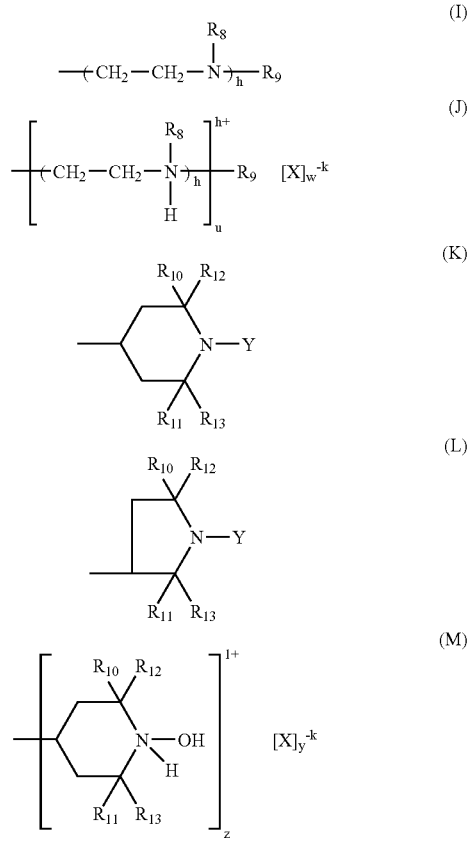

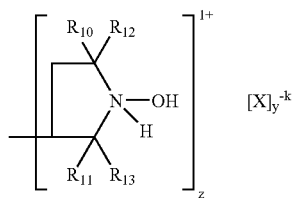

wherein $h \geq 1$, preferably 1 to 5000, more preferably 1 to 500, even more preferably 1 to 50, and most preferably 1 to 10;

X is the same as defined above;

k is 1 to 5, w is $\geq 1$, preferably 1 to 5000, more preferably 1 to 500, even more preferably 1 to 50, and most preferably 1 to 10, $u=1$ to 5, the total charge $kw=hu$ in formula (J);

$R_8$ and $R_9$ are independently hydrogen, a radical (functional group) derived from an organic ultraviolet absorber such as 2,4-dihydroxybenzophenone or 2-(2-hydroxyphenyl) benzotriazole, or a radical (functional group) of the formula (K), (L), (M) or (N);

$R_{10}$, $R_{11}$, $R_{12}$ and $R_{13}$ are independently alkyl groups $(CH_2)_iH$ unsubstituted or substituted, by 1 to a $(2i+1)$ number of substituents selected from, hydroxyl, mecapto, lower alkoxy, lower alkylthio, benzyl, amino, lower alkyl ester, amide, carboxyl and carboxylate groups, or radicals derived from an organic ultraviolet absorber such as 2,4-dihydroxybenzophenone or 2-(2-hydroxyphenyl)benzotriazole; and being uninterrupted or interrupted by i heteroatoms selected from —O— and —S—, wherein i is 1 to 14, preferably 1 to 6, and more preferably 1 to 4;

X is the same as defined above; k is 1 to 5, y is 1, z is 1 to 5, the total charge $ky=z$ in formula (M) or (N); Y is oxyl (O), hydroxyl (OH) or hydrogen (H).

In accordance with another aspect of the invention there is provided a pulp produced by the method of the invention.

In accordance with still another aspect of the invention there is provided a paper sheet containing a pulp of the invention.

In accordance with yet another aspect of the invention there is provided a light stable lignocellulosic material having a yellowing inhibitor or light stabilizer of formula (O) linked thereto via one or more secondary and/or tertiary amino or ammonium groups and/or quaternary ammonium groups thereof.

DETAILED DISCLOSURE OF THE INVENTION

In accordance with one aspect of the invention, there is provided a novel method for the production of light-stable and process-stable lignocellulosic materials such as mechanical wood pulps comprising the reaction of these materials with a water-soluble, yellowing inhibitor of formula (O) described hereinbefore possessing two or more secondary and/or tertiary amino or ammonium, and/or quaternary ammonium groups and being more especially of the formula (A), (B), (C), (D), (E), (F), (G) or (E) wherein Y is oxyl (O) or hydroxyl (OH) in an aqueous medium, or with a water-soluble, fibre-reactive hindered amine light stabilizer of formula (O) described hereinbefore and being more especially of the formula (A), (B), (C) or (D) wherein Y is hydrogen (H) in an alkaline peroxide bleaching medium or in an aqueous medium with a subsequent bleaching of the materials in an alkaline peroxide bleaching medium:

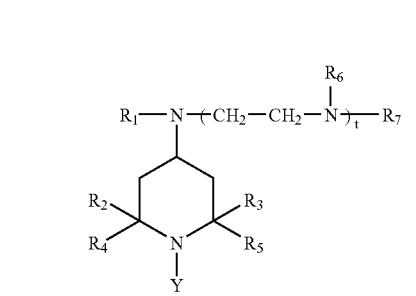
(A)

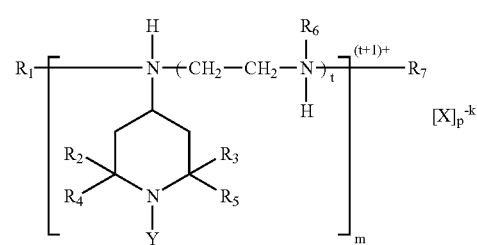
(B)

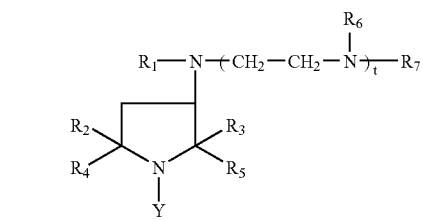
(C)

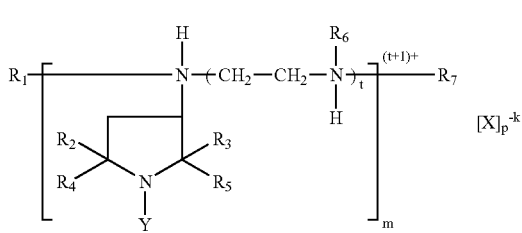
(D)

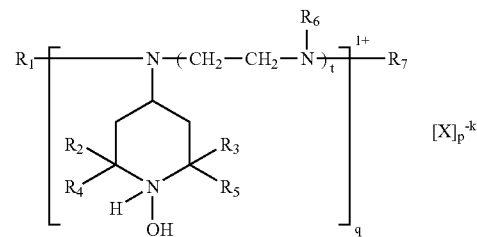
(E)

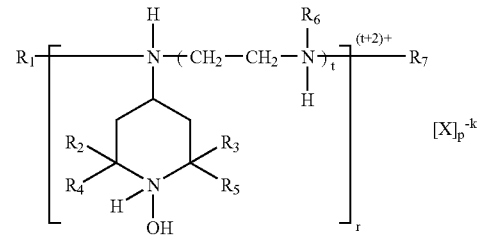
(F)

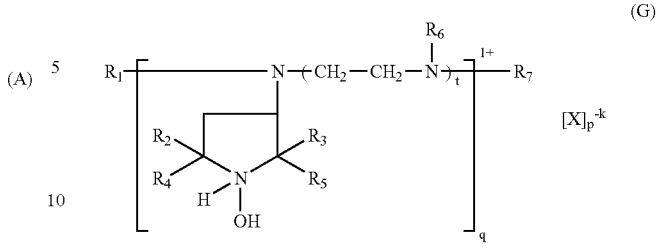
(G)

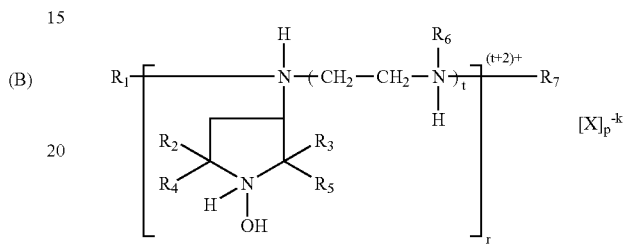
(H)

wherein $R_2$, $R_3$, $R_4$ and $R_5$ are independently alkyl groups $(CH_2)_jH$ unsubstituted or substituted by 1 to a $(2j+1)$ number of substituents, selected from hydroxyl, mercapto, lower alkoxy, lower alkylthio, benzyl, amino, lower alkyl ester, amide, carboxyl and carboxylate groups, or a radical derived from an organic ultraviolet absorber such as 2,4-dihydroxybenzophenone or 2-(2-hydroxyphenyl)benzotriazole; and being uninterrupted or interrupted by 1 to j number of heteroatoms selected from —O— and —S—, wherein j is 1 to 14, preferably 1 to 6, and more preferably 1 to 4;

X is an inorganic or organic anion such as carbonate, bicarbonate, chloride, bisulfate, sulfate, formate, acetate, citrate, phosphate, oxalate, ascorbate, ethylenediaminetetraacetate, or diethylenetriaminepentaacetate;

k is 1 to 5, p is an integer of 1 to 5001, more preferably 1 to 501, even more preferably 1 to 51, and most preferably 1 to 11 in formula (B) or (D), p is 1 in formula (E) or (G), and p is 1 to 5002, more preferably 1 to 502, even more preferably 1 to 52, and most preferably 1 to 12 in formula (F) or (H), m is 1 to 5, q is 1 to 5, r is 1 to 5, the total charge of $kp=(t+1)_m$ in formula (B) or (D), $kp=q$ in formula (E) or (G), and $kp=(t+2)_r$ in formula (F) or (H);

t is $\geq 1$, preferably 1 to 5000, more preferably 1 to 500, even more preferably 1 to 50, and most preferably 1 to 10;

$R_1$ is hydrogen or an ethylene amino or ammonium group of formula (I) or (J); when $t \geq 2$, $R_6$ and $R_7$ are independently hydrogen, a radical (functional group) derived from an organic ultraviolet absorber such as 2,4-dihydroxybenzophenone or 2-(2-hydroxyphenyl)benzotriazole, or a radical (functional group) of the formula (K), (L), (M) or (N);

when t=1, $R_6$ is hydrogen and $R_7$ is a radical (functional group) derived from an organic ultraviolet absorber such as 2,4-dihydroxybenzophenone or 2-(2-hydroxyphenyl) benzotriazole, or a radical (functional group) of the formula (K), (L), (M) or (N):

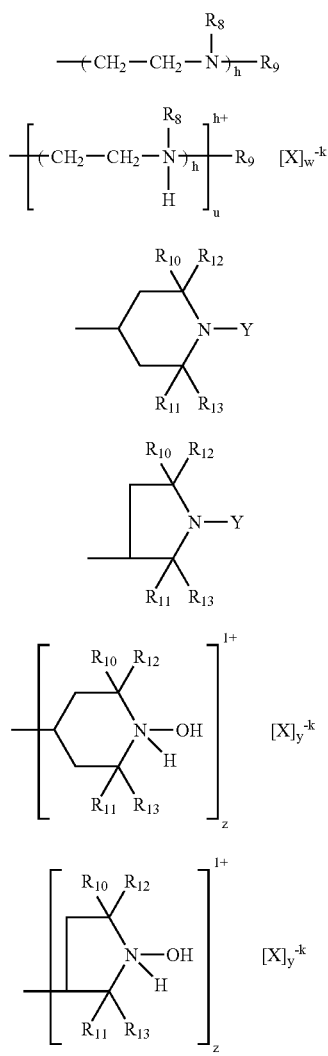

wherein h≧1, preferably 1 to 5000, more preferably 1 to 500, even more preferably 1 to 50, and most preferably 1 to 10;
X is the same as defined above;
k is 1 to 5,
w is ≧1, preferably 1 to 5000, more preferably 1 to 500, even more preferably 1 to 50, and most preferably 1 to 10,
u=1 to 5, the total charge kw=hu in formula (J);
$R_8$ and $R_9$ are independently hydrogen, a radical (functional group) derived from an organic ultraviolet absorber such as 2,4-dihydroxybenzophenone or 2-(2-hydroxyphenyl) benzotriazole, or a radical (functional group) of the formula (K), (L), (M) or (N);
$R_{10}$, $R_{11}$, $R_{12}$ and $R_{13}$ are independently alkyl groups $(CH_2)_iH$ unsubstituted or substituted, by 1 to a (2i+1) number of substituents selected from, hydroxyl, mecapto, lower alkoxy, lower alkylthio, benzyl, amino, lower alkyl ester, amide, carboxyl and carboxylate groups, or radicals derived from an organic ultraviolet absorber such as 2,4-dihydroxybenzophenone or 2-(2-hydroxyphenyl)benzotriazole; and being uninterrupted or interrupted by i heteroatoms selected from —O— and —S—, wherein i is 1 to 14, preferably 1 to 6, and more preferably 1 to 4;
X is the same as defined above; k is 1 to 5, y is 1, z is 1 to 5, the total charge ky=z in formula M) or (N); Y is oxyl (O), hydroxyl (OH) or hydrogen (H).

Alkaline peroxide bleaching medium in the present specification can be any combination of bleaching chemicals known in the prior art, dissolved or dispersed in aqueous medium and used for a single-stage or multi-stage alkaline hydrogen peroxide bleaching of wood pulps in one or more than one refiner, bleach tower, pulp mixer, and/or any other vessel, or the medium used for a single-stage or multi-stage alkaline hydrogen peroxide impregnation of wood chips in one or more than one impregnator.

The aqueous medium employed with the yellowing inhibitor may be the said alkaline peroxide-bleaching medium.

In another aspect of the invention there is provided a light-stable, process-stable mechanical pulp comprising a mechanical pulp containing a water-soluble yellowing inhibitor or light stabilizer that possesses said amino or ammonium groups as defined hereinbefore; said inhibitor or stabilizer being linked to said pulp via said amino or ammonium groups.

In other aspects of the invention there is provided a paper sheet in which the pulp component comprises a pulp of the invention, as described hereinbefore, as the sole pulp component or in conjunction with other pulps and in particular with a chemical pulp.

Papers of the present invention comprise paper or paperboard.

Lignocellulosic materials herein contemplate wood pulps, especially mechanical pulps, thermomechanical pulps and chemithermomechanical pulps; as well as wood chips.

Within the class of formula (O) when $R_2$, $R_3$, $R_4$, and $R_5$ are preferably unsubstituted and uninterrupted, and more especially they are preferably lower alkyl of 1 to 6 carbon atoms, preferably independently selected from methyl and ethyl and are most preferably all methyl. When they are substituted they are preferably mono- or di-substituted and when interrupted they are preferably singly interrupted.

Within the particular classes of formulae (A) and (C) there are particularly preferred in each case, the classes wherein t is an integer of 1 to 5, and $R_2$, $R_3$, $R_4$, and $R_5$ are all lower alkyl of 1 to 6 carbon atoms, and more preferably are independently selected from methyl and ethyl, and are most preferably are all methyl. In another preferred form of this latter class at least one of the $R_2$, $R_3$, $R_4$, $R_5$, $R_6$ and $R_7$ groups contains an organic ultraviolet absorber and preferably one derived from 2,4-dihydroxybenzophenone, 2-hydroxybenzophenone or 2-(2-hydroxyphenyl)benzotriazole.

Within the particular classes of formulae (B) and (D) there are particularly preferred in each case, the classes wherein t is an integer of 1 to 5, k is an integer of 1 to 3, p is an integer of 0 to 12; and $R_2$, $R_3$, $R_4$, and $R_5$ are all lower alkyl of 1 to 6 carbon atoms, and more preferably are independently selected from methyl and ethyl, and are most preferably are all methyl. In another preferred form of this latter class at least one of the $R_2$, $R_3$, $R_4$, $R_5$, R and $R_7$ groups contains an organic ultraviolet absorber and preferably one derived from 2,4-dihydroxybenzophenone, 2-hydroxybenzophenone or 2-(2-hydroxyphenyl)benzotriazole.

Within the particular classes of formulae (E), (F), (G) and (H) there are particularly preferred in each case, the classes wherein t is an integer of 1 to 5, k is an integer of 1 to 3, p is an integer of 0 to 12; and $R_2$, $R_3$, $R_4$, and $R_5$ are all lower alkyl of 1 to 6 carbon atoms, and more preferably are independently selected from methyl and ethyl, and are most preferably are all methyl. In another preferred form of this latter class at least one of the $R_2$, $R_3$, $R_4$, $R_5$, $R_6$ and $R_7$ groups contains an organic ultraviolet absorber and preferably one derived from 2,4-dihydroxybenzophenone, 2-hydroxybenzophenone or 2-(2-hydroxyphenyl)benzotriazole.

Within all the above formulae, including the different preferred classes described above and wherein X is present, X is preferably selected from carbonate, chloride, bisulfate, sulfate, formate, acetate, citrate, phosphate and ascorbate.

In a particularly preferred embodiment the yellowing inhibitor is N-(2,2,6,6-tetramethyl-1-oxyl-piperidin-4-yl)-N'-{2-[2-(2,2,6,6-tetramethyl-1-oxyl-piperidin-4-ylamino)-ethylamino]-ethyl}-ethane-1,2-diamine synthesized from a reductive amination of 4-oxo-2,2,6,6-tetramethylpiperidine-N-oxyl with triethylenetetramine in the presence of a reducing agent such as sodium triacetoxyborohydride.

The said yellowing inhibitors and most of the said hindered amine light stabilizers (HALS) are novel compounds. They can be synthesized by various methods used for the preparation of amino or ammonium compounds known in the prior art. For example, the reductive amination method illustrated in Scheme 2, can be used to synthesize some of the said yellowing inhibitors and HALS by combining, for example, two molar equivalents of an inhibitor or HALS possessing a carbonyl group (C=O) such as the commercially available, 4-oxo-2,2,6,6-tetramethylpiperidine-N-oxyl (Y=O.) (4-oxo-TEMPO) and 4-oxo-2,2,6,6-tetramethylpiperidine (Y=H) (abbreviated as 4-oxo-HALS) with an ethylene ammonium or amino compound such as the commercially available, diethylenetriamine (t=2), triethylenetetramine (t=3), tetraethylenepentamine (t=4), pentaethylenehexamine (t=5). The yields of the said yellowing inhibitors or HALS depend on, and can be optimised by careful selections of the amounts of the reactants, the solvents, the reaction conditions and other factors affecting their syntheses and isolation.

Scheme 2.
Synthesis of some of the said yellowing inhibitors and HALS by reductive amination.

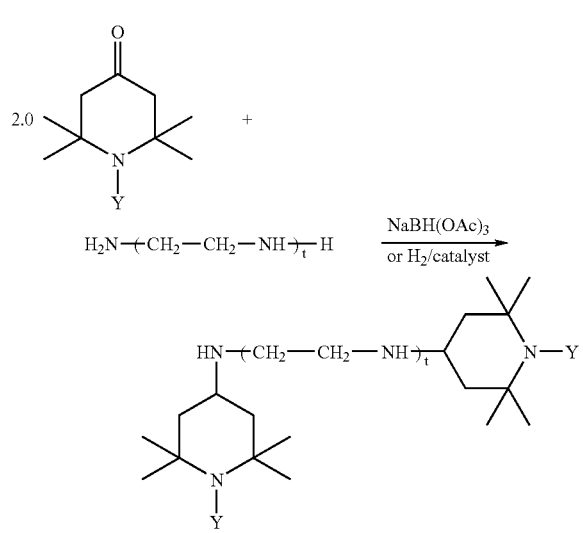

The reactions of the said inhibitors with the lignocellulosic materials can be suitably carried out in the absence or presence of air at a temperature of 20° C. to 120° C. and a consistency of 0.01% to 50% in an alkaline peroxide bleaching medium or an aqueous medium in a pH range of 3.5-12.5. The inhibitor charge can suitably range from 0.01% to 2.00% by weight based on oven-dried (OD) lignocellulosic material, e.g. pulp weight, preferably at least 0.05%, more preferably at least 0.1% and most preferably from 0.2% to 1.0%, by weight. The reaction may conveniently be carried out in a time of a few seconds to several hours.

The reactions of the said hindered amine light stabilizers with lignocellulosic materials can be carried out similarly to the reactions of the yellowing inhibitors. The hindered amine light stabilizer charge can suitably range from 0.01% to 2.00% by weight based on oven-dried (OD) lignocellulosic material, e.g. pulp weight, preferably at least 0.05%, more preferably at least 0.1% and most preferably from 0.2% to 1.0%, by weight. The reactions of mechanical pulps with the said fibre-reactive yellowing inhibitors or hindered amine light stabilizers in alkaline peroxide bleaching media and the bleaching of mechanical wood pulps can be carried out at a temperature of 20° C.-120° C., a consistency of 1.5%-50% and a bleaching time of a few minutes to several hours.

The alkaline peroxide impregnation of the wood chips in the presence of the said yellowing inhibitors or hindered amine light stabilizers can be carried out at a temperature of 40° C.-90° C., a solid content of 30%-60%, by weight, and an impregnation time of five minutes to two hours.

The charge of bleaching or impregnation chemicals, hydrogen peroxide, sodium hydroxide (or magnesium hydroxide, magnesium oxide, or hydroxide or oxide of other metals), sodium silicate and magnesium sulfate can be varied depending on the target brightness, the economics, the mill configurations and other process conditions. The charge of a said yellowing inhibitor or hindered amine light stabilizer can suitably range from 0.05% to 2.00% by weight based on oven-dried (OD) pulp weight, preferably from 0.1% to 1.0%, by weight.

The reaction of said yellowing inhibitors can also be conveniently carried out in any agitated tank of the stock preparation system of a paper machine. Alternatively, the said yellowing inhibitors according to this invention could be added at various points in the stock approach system, as long as they are completely mixed with the furnish and a sufficient time is available for their absorption to the pulp fibres.

Further according to the present invention, mechanical pulps with nearly complete brightness stability can be produced by reaction of the pulps with the said yellowing inhibitors or hindered amine light stabilizers, and then by coating of the paper made from the resulting pulps with an organic or inorganic ultraviolet absorber.

The modified pulp of the invention may be the sole pulp component of a paper sheet formed from the pulp, or it may be employed in conjunction with chemical pulp. In the case of the latter, the paper may have a pulp component comprising 1 to 100% by weight of the modified pulp of the invention and 0 to 99%, by weight of a chemical pulp, to a total of 100%.

It has also been found advantageous to react in-situ or treat the pulp reacted with the inhibitors of formulas (A), (B), (C) and (D) where Y is oxyl with a reducing agent such as ascorbic acid or sodium borohydride, or an acid such as hydrochloric acid or citric acid to remove the orange colour of the inhibitor and thus retain the initial brightness value of the reacted pulp.

EXAMPLES

The present invention is illustrated but not limited by the following examples:

General Procedure A Employed in the Examples:
Synthesis of N-(2,2,6,6-Tetramethyl-1-oxyl-piperidin-4-yl)-N'-{2-[2-(2,2,6,6-tetramethyl-1-oxyl-piperidin-4-ylamino)-ethylamino]-ethyl}-ethane-1,2-diamine The general, laboratory procedure for reductive amination [Abdel-Magid, et al., J. Org. Chem. 61: 3849-3862, 1996] is used for the synthesis of N-(2,2,6,6-tetramethyl-1-oxyl-piperidin-4-yl)-N'-{2-[2-(2,2,6,6-tetramethyl-1-oxyl-piperidin-4-ylamino)-ethylamino]-ethyl}-ethane-1,2-diamine (abbreviated as TETA-2TEMPO). To 5.0 mmol of triethylenetetramine (abbreviated as TETA) (1.219 g, 60% TETA) and 10.0 mmol of 4-oxo-2,2,6,6-tetramethylpiperidine-N-oxyl (4-oxo-TEMPO) (1.702 g) in 25 mL of 1,2-dichloroethane is added 15.0 mmol of sodium triacetoxyborohydride (3.346 g, 95%) and 10.0 mmol of glacial acetic acid (0.575 mL, 17.4 M) under nitrogen. The mixture is stirred at room temperature (~20° C.) for 2 hours or until 4-oxo-TEMPO is consumed as shown by thin layer chromatography. At the end of the reaction, 50 mL of 1N sodium hydroxide is added to the mixture. The product is extracted twice with 40 mL of diethyl ether in a separatory funnel. The aqueous solution is removed. The organic extract is washed with 20 mL of saturated sodium chloride solution and dried over anhydrous magnesium sulfate ($MgSO_4$) overnight. Filtration of $MgSO_4$, removal of the solvent in the filtrate under reduced pressure, and drying under vacuum for 2 hours give 0.972 g of TETA-2TEMPO as orange oil. The structure of TETA-2TEMPO is established by $^1$H NMR and mass spectrometry analysis of its hydroxylamine hydrochloride derivative synthesized according to the general procedure B-(a) described below.

General Procedure B Employed in the Examples:
Synthesis of N-(2,2,6,6-Tetramethyl-1-hydroxyl-piperidin-4-yl)-N'-{2-[2-(2,2,6,6-tetramethyl-1-hydroxyl-piperidin-4-ylamino)-ethylamino]-ethyl}-ethane-1,2-diamine-Hexahydrochloride, and 4-Amino-2,2,6,6-tetramethyl-N-hydroxyl-piperidine Dihydrochloride (a) N-(2,2,6,6-Tetramethyl-1-hydroxyl-piperidin-4-yl)-N'-{2-[2-(2,2,6,6-tetramethyl-1-hydroxyl-piperidin-4-ylamino)-ethylamino]-ethyl}-ethane-1,2-diamine Hexahydrochloride The laboratory procedure for the conversion of hindered nitroxide to its hydroxylamine hydrochloride derivative [Sosnovsky and Cai, J. Org. Chem. 60: 3414-3418, 1995] is used to convert TETA-2TEMPO to its hydroxylamine hydrochloride derivative, N-(2,2,6,6-tetramethyl-1-hydroxyl-piperidin-4-yl)-N'-{2-[2-(2,2,6,6-tetramethyl-1-hydroxyl-piperidin-4-ylamino)-ethylamino]-ethyl}-ethane-1,2-diamine hexahydrochloride (abbreviated as TETA-2TEMPOH-6HCl). To 0.279 g of TETA-2TEMPO (0.614 mmol) dissolved in 2.0 mL of ethanol and cooled in an ice bath is added 0.6 mL of concentrated hydrochloric acid (HCl) (4.0 mmol). The mixture is stirred for five minutes and then allowed to warm to room temperature (~20° C.). 0.3 mL of concentrated HCl is added (2.0 mmol) and the mixture is stirred at room temperature (~20° C.) for two hours. At the end of the reaction, 2.0 mL of ethanol is added, followed by a slow addition of 20 mL of diethyl ether to allow the precipitation of the product. The mixture is then stored in a fridge overnight to allow a complete precipitation of the product from the solution. The precipitated product is filtered, washed with a mixture of diethyl ether and ethanol (15/2 volume/volume) and dried under vacuum for 3 hours to give 0.291 g of TETA-2TEMPOH-6HCl as an off-white solid. The structure of TETA-2TEMPOH-6HCl is established by $^1$H NMR and mass spectrometry. $^1$H NMR (in $D_2O$): δ1.40 (s, 24H, C$\underline{H}_3$), δ1.95 (t, J=13 Hz, 4H, axial C$\underline{H}_2$), δ2.43 (d, J=13 Hz, 4H, equatorial C$\underline{H}_2$), δ3.02-3.40 (m, 8H, —HNC$\underline{H}_2$C$\underline{H}_2$NHC$\underline{H}_2$C$\underline{H}_2$NHC$\underline{H}_2$C$\underline{H}_2$NH—), δ3.44 (s, 4H, —HNC$\underline{H}_2$C$\underline{H}_2$NHC$\underline{H}_2$C$\underline{H}_2$NHC$\underline{H}_2$C$\underline{H}_2$NH—), δ3.70-3.90 (m, 2H, C$\underline{H}$; MS (EI): m/z (relative intensity)=456 ($M^+$-6HCl: 10).

(b)
4-Amino-2,2,6,6-tetramethyl-N-hydroxyl-piperidine Dihydrochloride

Using similar procedure as described in (a), 0.223 g of 4-amino-2,2,6,6-tetramethylpiperidine-N-oxyl (4-amino-TEMPO, from Aldrich) is converted to its hydroxylamine hydrochloride derivative, 4-amino-2,2,6,6-tetramethyl-N-hydroxyl-piperidine dihydrochloride (abbreviated as 4-amino-TEMPOH-2HCl) (0.241 g) as a white solid. The structure of 4-amino-TEMPOH-2HCl is also established by $^1$H NMR and mass spectrometry. $^1$H NMR (in $D_2O$): δ1.35 (s, 12H, C$\underline{H}_3$), δ1.90 (t, J=13 Hz, 2H, axial C$\underline{H}_2$), δ2.26 (d, J=13 Hz, 2H, equatorial C$\underline{H}_2$), δ3.66-3.92 (m, 1H, C$\underline{H}$); MS (EI): m/z (relative intensity)=172 ($M^+$-2HCl: 20).

General Procedure C Employed in the Examples:
Reaction of Mechanical Pulps with a Said Yellowing Inhibitor or Hindered Amine Light Stabilizer at Low Consistency Unless otherwise specified, a known amount of a mechanical wood pulp and a said water-soluble, yellowing inhibitor or hindered amine light stabilizer (0.01%-2.00% on pulp) are mixed with deionized water to give a pulp consistency of 1.5%. "Consistency" is the weight percentage of pulp in a pulp and water mixture. The pulp slurry is kept at room temperature (~20° C.) or heated to a desired temperature. The pH of the pulp slurry is adjusted to a desired value (3.5-12.5) by addition of a small amount of NaOH or 1M HCl (or 1M $H_2SO_4$). The pulp slurry is stirred for 3 hours unless otherwise specified. The pH of the pulp slurry is then adjusted to near neutral (pH 6.5-7.0) when necessary. The pulp slurry is diluted with deionized water to 0.5% to 1.0% consistency, filtered with filtrate recycling (to recover fines), and washed with deionized water. The filtered pulp is then once again diluted with deionized water, stirred and filtered with filtrate recycling. Pulp obtained in this manner is resistant to colour reversion.

General Procedure D Employed in the Examples:
Reaction of Mechanical Pulps with a Said Yellowing Inhibitor or Hindered Amine Light Stabilizer at Medium to High Consistency in Aqueous Medium A said water-soluble yellowing inhibitor or hindered amine light stabilizer (0.01%-2.00% on pulp) is dissolved in a known amount of deionized water (unless otherwise specified) that when mixed with a mechanical pulp will give a desired consistency (5% to 40% consistency). The pH of the inhibitor solution is adjusted to a desired value and the inhibitor solution is added to the pulp in a polyethylene bag. The bag is sealed and immersed in a hot water bath set at 40° C. for 3 hours, unless otherwise specified, with manual mixing of the pulp every hour. The bag is then removed and cooled in a cold water bath to room temperature (~20° C.). The pH of the pulp slurry is adjusted to near neutral (pH 6.5-7.0) when necessary. The pulp slurry is then diluted with deionized water to 0.5% to 1.0% consistency, filtered with filtrate recycling, and washed with deionized water. The filtered pulp is then once again diluted with deionized water, stirred and filtered with filtrate recycling. Pulp obtained in this manner is resistant to colour reversion.

General Procedure E Employed in the Examples:
Reaction of Mechanical Pulp with a Said Yellowing Inhibitor or Hindered Amine Light Stabilizer in an Alkaline Peroxide Bleaching Medium Prior to bleaching, the mechanical wood pulp is treated with a chelating agent such as diethylenetriaminepentaacetic acid, pentasodium salt (DTPA-Na$_5$) (0.2%-0.6%) at 50° C., pH 5-6 and 2% consistency for 30 minutes to complex metal ions [Ali et al. *J. Pulp Paper Sci.*, 12(6): J166-172, 1986]. Alternatively, the chelating agent is added directly to the bleaching of the pulps, thus eliminating the pretreatment stage. Chelated or unchelated mechanical pulp (normally 12 g OD) is mixed in a Hobart mixer with a known amount of magnesium sulfate, sodium silicate, sodium hydroxide, hydrogen peroxide, chelating agent (for unchelated pulp), said yellowing inhibitor or hindered amine light stabilizer (0.01%-2.00% on pulp) and, unless otherwise specified, deionized water to give a pulp of desired consistency (5.0%-40%). For bleaching at a temperature <100° C., the pulp is then transferred to a polyethylene bag, sealed, and immersed in a hot water bath set at a known temperature (>20° C., ≦100° C.) for a known bleaching time with occasional manual mixing. For bleaching at ≧100° C. and ≦120° C., the pulp is placed in a pyrex beaker, covered with a watch glass and heated in an autoclave oven set at a known temperature (100-120° C.) for a known bleaching time. At the end of bleaching, the pulp, either in the bag or in the beaker is cooled in a cold water bath to room temperature (~20° C.). The pulp is diluted with, unless otherwise specified, deionized water, to a consistency of 0.5% to 1.0%. The pH of the pulp slurry is adjusted to 6.5-7.0 by addition of 6% aqueous sulfur dioxide solution or 1N sulfuric acid. The pulp is filtered with filtrate recycling and washed thoroughly with deionized water. Pulp obtained in this manner is resistant to colour reversion.

General Procedure F Employed in the Examples:
Treatment of Pulps in Aqueous Medium Containing Calcim Ions (Ca$^{2+}$)

A known amount of an inhibitor-treated or untreated mechanical pulp and calcium chloride (CaCl$_2$) (1.0% on pulp) are mixed with deionized water to give a pulp consistency of 1.5%. The pH of the pulp slurry is adjusted to 5.5-6.0. The pulp slurry is stirred for 2 hours at room temperature (~20° C.). The pulp slurry is diluted with deionized water to 0.5% to 1.0% consistency, filtered with filtrate recycling, and washed with deionized water. The filtered pulp is then once again diluted with deionized water, stirred and filtered with filtrate recycling.

Handsheet Preparation, Nitrogen Content Analysis and Ambient Office Light Exposure Handsheets of the pulps are prepared according to PAPTAC Test Method, Standard C.5 from deionized water, unless otherwise specified. Total nitrogen contents of selected sheets are measured according to TAPPI Test Methods, T418 om-90. Ambient office light exposure of the sheets is carried out by placing the sheets on an office desk under normal, fill spectrum fluorescent office lights at a distance of about six feet with the lights being on 24 hours a day. Unless otherwise specified, the light intensity for such ambient office light exposure is 82±4 foot-candle. Measurements of the % ISO brightness of the samples are performed on a Technibrite Micro TB-1C instrument according to TAPPI Test Methods, T525 om-02 (except that only a single ply of a 200 g/m$^2$ handsheet is used over a black background) at different time intervals and converted to post color number (PC number).

PC number is defined as follows:

$$PC=[(k/s)_{after}-(k/s)_{before}]\times 100$$

$$k/s=(1-R_{inf})^2/2R_{inf}$$

where k and s are the absorption and scattering coefficients, respectively, and $R_{inf}$ is the value of ISO brightness. The relationship between $R_{inf}$ and the chromophore concentration is non-linear while the PC number is roughly linear to the concentration of the chromophore. The lower the PC number is, the less yellow (brighter) the sample.

Example 1

Samples of an aspen BCTMP pulp (ISO brightness=82.8%) were reacted at room temperature (~20° C.) and pH 6.5-7.0, according to the general procedure C disclosed above, with 0.5% (on OD pulp) of 4-amino-2,2,6,6-tetramethylpiperidine-N-oxyl (4-amino-TEMPO), and with 1.0% (on OD pulp) of N-(2,2,6,6-tetramethyl-1-oxyl-piperidin-4-yl)-N'-{2-[2-(2,2,6,6-tetramethyl-1-oxyl-piperidin-4-ylamino)-ethylamino]-ethyl}-ethane-1,2-diamine (abbreviated as TETA-2TEMPO) synthesized according to the general procedure A disclosed above, respectively. Portions of the 4-amino-TEMPO-reacted pulp and the TETA-2TEMPO-reacted pulp were treated with 1.0% (on OD pulp) of calcium chloride according to the general procedure F disclosed above. Table 1 shows the PC number of the various pulps vs. the ambient light exposure times. The pulp reacted with 4-amino-TEMPO shows much improved brightness stability but loses most of the improved brightness stability after treatment in an aqueous medium containing calcium ions. The pulp reacted with TETA-2TEMPO shows much improved brightness stability and retains such improved brightness stability after treatment in an aqueous medium containing calcium ions.

TABLE 1

PC Number of Various Pulps vs. Light Exposure Time

| Light exposure time (days) | Aspen BCTMP | Reacted with 4-amino-TEMPO | Reacted with 4-amino-TEMPO and then treated with CaCl$_2$ | Reacted with TETA-2TEMPO | Reacted with TETA-2TEMPO and then treated with CaCl$_2$ |
|---|---|---|---|---|---|
| 0 | 0.00 | 0.00 | 0.00 | 0.00 | 0.00 |
| 3 | 0.49 | 0.28 | 0.51 | 0.18 | 0.23 |
| 5 | 0.72 | 0.34 | 0.65 | 0.33 | 0.37 |
| 7 | 0.89 | 0.47 | 0.89 | 0.44 | 0.48 |
| 14 | 1.56 | 0.77 | 1.45 | 0.77 | 0.81 |
| 17 | 1.83 | 0.89 | 1.70 | 0.90 | 0.97 |
| 19 | 2.05 | 0.96 | 1.86 | 1.03 | 1.09 |
| 40 | 3.95 | 1.83 | 3.60 | 1.90 | 1.97 |
| 42 | 4.17 | 1.90 | 3.76 | 2.03 | 2.08 |

Example 2

Samples of an aspen BCTMP pulp (ISO brightness=82.8%, total nitrogen content=0.028% on OD pulp) were reacted at room temperature (a 20° C.) and pH 6.5-7.0, according to the general procedure C disclosed above, with 0.5% (on OD pulp) of 4-amino-2,2,6,6-tetramethyl-N-hydroxyl-piperidine dihydrochloride (abbreviated as 4-amino-TEMPOH-2HCl), and with 1.0% (on OD pulp) of N-(2,2,6,6-tetramethyl-1-hydroxyl-piperidin-4-yl)-N'-{2-[2-(2,2,6,6-tetramethyl-1-hydroxyl-piperidin-4-ylamino)-ethylamino]-ethyl}-ethane-1,2-diamine hexahydrochloride (abbreviated as TETA-2TEMPOH-6HCl), respectively. Both 4-amino-TEMPOH-2HCl and TETA-2TEMPOH-6HCl were synthesized according to the general procedure B disclosed above. Portions of the 4-amino-TEMPOH-2HCl-reacted pulp and the TETA-2TEMPOH-6HCl-reacted pulp were treated with 1.0% (on OD pulp) of calcium chloride according to the general procedure F disclosed above. Table 2.1 and Table 2.2 show the PC number and the ISO brightness, respectively, of the various pulps vs. the ambient light exposure times. The pulp reacted with 4-amino-TEMPOH-2HCl shows much improved brightness stability but loses most of the improved brightness stability after treatment in an aqueous medium containing calcium ions. The pulp reacted with TETA-2TEMPOH-6HCl shows much improved brightness stability and retains such improved brightness stability after treatment in an aqueous medium containing calcium ions. The total nitrogen contents of the pulps reacted with 4-amino-TEMPOH-2HCl before and after calcium chloride treatment are 0.066% (on OD pulp) and 0.032% (on OD pulp), respectively, corresponding to a loss of 89% of the inhibitor from the 4-amino-TEMPOH-2HCl-reacted pulp during the calcium chloride treatment. The total nitrogen contents of the pulps reacted with TETA-2TEMPOH-6HCl before and after calcium chloride treatment are 0.113% (on OD pulp) and 0.104% (on OD pulp), respectively, corresponding to a loss of only 10% of the inhibitor from the TETA-2TEMPOH-6HCl-reacted pulp during the calcium chloride treatment.

TABLE 2.1

PC Number of Various Pulps vs. Light Exposure Time

| Light exposure time (days) | Aspen BCTMP | Reacted with 4-amino-TEMPOH-2HCl | Reacted with 4-amino-TEMPOH-2HCl and then treated with CaCl$_2$ | Reacted with TETA-2TEMPOH-6HCl | Reacted with TETA-2TEMPOH-6HCl and then treated with CaCl$_2$ |
|---|---|---|---|---|---|
| 0 | 0.00 | 0.00 | 0.00 | 0.00 | 0.00 |
| 3 | 0.49 | 0.33 | 0.54 | 0.26 | 0.28 |
| 5 | 0.72 | 0.49 | 0.78 | 0.42 | 0.42 |
| 7 | 0.89 | 0.59 | 0.93 | 0.53 | 0.54 |
| 14 | 1.56 | 0.91 | 1.52 | 0.90 | 0.90 |
| 17 | 1.83 | 1.07 | 1.75 | 1.04 | 1.04 |
| 19 | 2.05 | 1.12 | 1.90 | 1.20 | 1.19 |
| 24 | 2.50 | 1.39 | 2.34 | 1.41 | 1.38 |
| 26 | 2.67 | 1.47 | 2.49 | 1.49 | 1.47 |
| 40 | 3.95 | 2.03 | 3.56 | 2.10 | 2.08 |
| 42 | 4.17 | 2.10 | 3.71 | 2.23 | 2.17 |

TABLE 2.2

ISO Brightness of Various Pulps vs. Light Exposure Time

ISO Brightness, %

| Light exposure time (days) | Aspen BCTMP | Reacted with 4-amino-TEMPOH-2HCl | Reacted with 4-amino-TEMPOH-2HCl and then treated with CaCl$_2$ | Reacted with TETA-2TEMPOH-6HCl | Reacted with TETA-2TEMPOH-6HCl and then treated with CaCl$_2$ |
|---|---|---|---|---|---|
| 0 | 82.8 | 82.7 | 82.2 | 82.2 | 82.2 |
| 3 | 80.8 | 81.3 | 80.1 | 81.2 | 81.1 |
| 5 | 80.0 | 80.7 | 79.3 | 80.6 | 80.6 |
| 7 | 79.4 | 80.3 | 78.8 | 80.2 | 80.2 |
| 14 | 77.3 | 79.2 | 77.0 | 78.9 | 78.9 |
| 17 | 76.5 | 78.7 | 76.3 | 78.5 | 78.4 |
| 19 | 75.9 | 78.5 | 75.9 | 78.0 | 78.0 |
| 24 | 74.7 | 77.7 | 74.8 | 77.3 | 77.4 |
| 26 | 74.3 | 77.4 | 74.4 | 77.1 | 77.1 |
| 40 | 71.4 | 75.8 | 71.9 | 75.4 | 75.4 |
| 42 | 70.9 | 75.7 | 71.6 | 75.1 | 75.2 |

Example 3

Samples of an aspen BCTNP pulp (ISO brightness=81.6%) were reacted at room temperature (~20° C.) and pH 6.5-7.0, according to the general procedure C disclosed above, with 0.5% (on OD pulp) of 4-amino-TEMPOH-2HCl, and with 0.5% (on OD pulp) of TETA-2TEMPOH-6HCl, respectively. Both 4-amino-TEMPOH-2HCl and TETA-2TEMPOH-6HCl were synthesized according to the general procedure B disclosed above. Handsheets of the control aspen BCTMP pulp and the inhibitor-reacted pulps were prepared from deionized (DI) water (H$_2$O) according to PAPTAC Test Method, Standard C.5, and/or from DI H$_2$O containing 0.15 g of CaCl$_2$ per litre of DI H$_2$O, respectively. Table 3.1 and Table 3.2 show the PC number and the ISO brightness of the various handsheets vs. the ambient light exposure times. The sheet of 4-amino-NMPOH-TEMPOH-2HCl-reacted pulp shows much improved brightness stability only when it is prepared from DI H$_2$O. The sheet of TETA-2TEMPOH-6HCl-reacted pulp shows much improved brightness stability whether it is prepared from DI H$_2$O or from DI H$_2$O containing calcium ions (Ca$^{2+}$). The total nitrogen contents of the sheets made from the 4-amino-TEMPOH-2HCl-reacted pulps in DI H$_2$O and in DI H$_2$O containing Ca$^{2+}$ are 0.065% (on OD pulp) and 0.030% (on OD pulp), respectively, corresponding to an inhibitor attachment of 0.32% (on OD pulp) and 0.02% (on OD pulp). The total nitrogen contents of the sheets made from the TETA-TEMPOH-6HCl-reacted pulps in DI H$_2$O and in DI H$_2$O containing Ca$^{2+}$ are 0.076% (on OD pulp) and 0.066% (on OD pulp), respectively, corresponding to an inhibitor attachment of 0.50% (on OD pulp) and 0.40% (on OD pulp).

TABLE 3.1

PC Number of Various Sheets vs. Light Exposure Time

PC Number of Various Sheets

| Light exposure time (days) | BCTMP from DI H$_2$O + CaCl$_2$ | 4-Amino-TEMPOH-2HCl-reacted pulp, from DI H$_2$O | 4-Amino-TEMPOH-2HCl-reacted pulp, from DI H$_2$O + CaCl$_2$ | TETA-2TEMPOH-6HCl-reacted pulp, from DI H$_2$O | TETA-2TEMPOH-6HCl-reacted pulp, from DI H$_2$O + CaCl$_2$ |
|---|---|---|---|---|---|
| 0 | 0.00 | 0.00 | 0.00 | 0.00 | 0.00 |
| 3 | 0.49 | 0.28 | 0.42 | 0.31 | 0.32 |
| 5 | 0.76 | 0.43 | 0.64 | 0.44 | 0.47 |
| 7 | 0.98 | 0.55 | 0.83 | 0.55 | 0.61 |
| 10 | 1.32 | 0.74 | 1.12 | 0.74 | 0.81 |
| 12 | 1.43 | 0.80 | 1.25 | 0.83 | 0.90 |
| 14 | 1.64 | 0.90 | 1.41 | 0.95 | 1.01 |
| 17 | 1.97 | 1.07 | 1.67 | 1.09 | 1.19 |
| 19 | 2.14 | 1.17 | 1.85 | 1.17 | 1.28 |

TABLE 3.2

ISO Brightness of Various Sheets vs. Light Exposure Time

| | ISO Brightness of Various Sheets, % | | | | |
|---|---|---|---|---|---|
| Light exposure time (days) | BCTMP from DI $H_2O$ + $CaCl_2$ | 4-Amino-TEMPOH-2HCl-reacted pulp, from DI $H_2O$ | 4-Amino-TEMPOH-2HCl-reacted pulp, from DI $H_2O$ + $CaCl_2$ | TETA-2TEMPOH-6HCl-reacted pulp, from DI $H_2O$ | TETA-2TEMPOH-6HCl-reacted pulp, from DI $H_2O$ + $CaCl_2$ |
| 0 | 81.2 | 81.7 | 81.8 | 81.6 | 81.6 |
| 3 | 79.4 | 80.6 | 80.2 | 80.5 | 80.4 |
| 5 | 78.5 | 80.1 | 79.4 | 80.0 | 79.9 |
| 7 | 77.8 | 79.7 | 78.8 | 79.6 | 79.4 |
| 10 | 76.8 | 79.0 | 77.9 | 79.0 | 78.7 |
| 12 | 76.5 | 78.8 | 77.5 | 78.7 | 78.5 |
| 14 | 75.9 | 78.5 | 77.0 | 78.3 | 78.1 |
| 17 | 75.1 | 78.0 | 76.2 | 77.8 | 77.5 |
| 19 | 74.6 | 77.7 | 75.7 | 77.6 | 77.3 |

Example 4

Samples of an aspen BCTMP pulp (ISO brightness=84.1%) were reacted with 0.5% (on OD pulp) of 4-amino-TEMPOH-2HCl, and with 0.5% (on OD pulp) of TETA-2TEMPOH-6HCl at room temperature (~20° C.) and pH 6.5-7.0 for 2 hours, according to the general procedure C disclosed above except that fresh water from a market BCTWP mill was used instead of DI $H_2O$. Both 4-amino-TEMPOH-2HCl and TETA-2TEMPOH-6HCl were synthesized according to the general procedure B disclosed above. Table 4 shows the PC number and the ISO brightness, respectively, of the various pulps vs. the ambient light exposure times. The pulp reacted with TETA-2TEMPOH-6HCl shows higher brightness stability than the control pulp as well as the pulp reacted with 4-amino-TEMPOH-2HCl.

TABLE 4

PC Number and ISO Brightness of Various Pulps vs. Light Exposure Time

| | PC Number (ISO Brightness, %) | | |
|---|---|---|---|
| Light exposure time (days) | Aspen BCTMP | Reacted with 4-amino-TEMPOH-2HCl in mill fresh water | Reacted with TETA-2TEMPOH-6HCl in mill fresh water |
| 0 | 0.00 (84.1) | 0.00 (83.9) | 0.00 (84.2) |
| 2 | 0.27 (82.8) | 0.19 (83.0) | 0.17 (83.4) |
| 5 | 0.59 (81.5) | 0.39 (82.2) | 0.37 (82.5) |
| 7 | 0.77 (80.8) | 0.49 (81.8) | 0.46 (82.1) |
| 9 | 0.99 (80.0) | 0.62 (81.3) | 0.58 (81.7) |
| 14 | 1.40 (78.6) | 0.86 (80.3) | 0.80 (80.8) |
| 16 | 1.53 (78.2) | 0.95 (80.0) | 0.86 (80.6) |
| 19 | 1.82 (77.3) | 1.09 (79.5) | 1.02 (80.0) |

Example 5

Samples of a spruce BTMP pulp (ISO brightness=72.1%) were reacted at room temperature (~20° C.) and pH 6.5-7.0, according to the general procedure C disclosed above, with 0.5% (on OD pulp) of 4-amino-TEMPOH-2HCl, and with 0.5% (on OD pulp) of TETA-2TEMPOH-6HCl, respectively. Both 4-amino-TEMPOH-2HCl and TETA-2TEMPOH-6HCl were synthesized according to the general procedure B disclosed above. Handsheets of the control, spruce BTMP and the inhibitor-reacted BTMP pulps were prepared from DI $H_2O$ according to PAPTAC Test Method, Standard C.5, and/or from DI $H_2O$ containing 0.15 g of $CaCl_2$ per litre of DI $H_2O$, respectively. Table 5 shows the ISO brightness of the various handsheets vs. the ambient light exposure times. The sheet of 4-amino-TEMPOH-2HCl-reacted BTMP shows much improved brightness stability over that of the control BTMP only when it is made from DI $H_2O$. The sheet of TETA-2TEMPOH-6HCl-reacted BTMP shows much improved brightness stability over that of the control BTMP whether it is made from DI $H_2O$ or from DI $H_2O$ containing calcium ions ($Ca^{2+}$).

TABLE 5

ISO Brightness of Various Sheets vs. Light Exposure Time

| Light exposure time (days) | ISO Brightness of Various Sheets, % | | | | |
|---|---|---|---|---|---|
| | spruce BTMP from DI H$_2$O + CaCl$_2$ | 4-Amino-TEMPOH-2HCl-reacted pulp, from DI H$_2$O | 4-Amino-TEMPOH-2HCl-reacted pulp, from DI H$_2$O + CaCl$_2$ | TETA-2TEMPOH-6HCl-reacted pulp, from DI H$_2$O | TETA-2TEMPOH-6HCl-reacted pulp, from DI H$_2$O + CaCl$_2$ |
| 0 | 72.4 | 72.2 | 73.0 | 72.3 | 72.4 |
| 2 | 70.9 | 72.0 | 71.4 | 71.9 | 71.9 |
| 4 | 69.8 | 71.6 | 70.5 | 71.4 | 71.4 |
| 7 | 68.6 | 71.2 | 69.4 | 70.9 | 70.9 |
| 11 | 67.0 | 70.6 | 68.0 | 70.1 | 70.1 |
| 14 | 66.1 | 70.2 | 67.1 | 69.7 | 69.7 |
| 18 | 65.1 | 69.9 | 66.2 | 69.4 | 69.1 |
| 23 | 63.7 | 69.4 | 64.9 | 68.6 | 68.4 |
| 25 | 63.1 | 69.1 | 64.3 | 68.3 | 68.1 |
| 28 | 62.5 | 68.8 | 63.7 | 67.9 | 67.7 |
| 30 | 62.0 | 68.6 | 63.2 | 67.6 | 67.5 |

Example 6

1.219 g of triethylenetetraamine (TETA), H$_2$N(CH$_2$CH$_2$NH)$_3$H, was reacted with 1.634 g of 2,2,6,6-tetramethyl-4-piperidone, i.e. 4-oxo-2,2,6,6-tetramethylpiperidine (abbreviated as 4-oxo-HALS) instead of 4-oxo-TEMPO, 3.346 g of sodium triacetoxyborohydride, and 0.575 mL of glacial acetic acid according to the general procedure A to give 1.265 g of the reductive amination product (abbreviated as TETA-2HALS) as light-yellow oil. The structure of TETA-2HALS is shown in Scheme 3, and it was established by $^1$H NMR and mass spectrometry. $^1$H NMR (in D$_2$O): δ0.79 (t, J=12 Hz, 4H, axial CH$_2$), δ0.99 (s, 12H, axial CH$_3$), δ1.06 (s, 12H, equatorial CH$_3$), δ1.73 (dd, 4H, equatorial CH$_2$), δ2.30-2.43 (m, 1H, axial CH), δ2.50-2.71 (m, 12H, —HNCH$_2$CH$_2$NHCH$_2$CH$_2$NHCH$_2$CH$_2$NH—), δ2.76-2.91 (m, 1H, equatorial CH); MS (ES+): m/z (relative intensity)=425 (M$^+$+H: 82).

Scheme 3. Structure of TETA-2HALS.

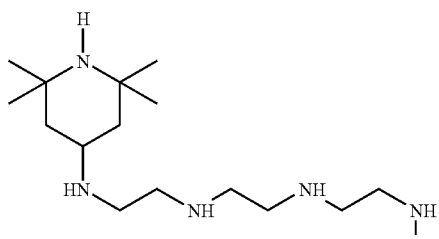

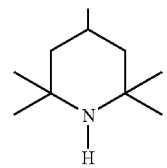

"TETA-2HALS"

Samples of a chelated softwood (SW) TMP pulp were reacted with 1.0% and 0.0% (on OD pulp) of TETA-2HALS, respectively, in an alkaline peroxide bleaching medium consisting of 7.0% (on OD pulp) of H$_2$O$_2$, 6.0% (on OD pulp) of NaOH, 3.0% (on OD pulp) of Na$_2$SiO$_3$ and 0.05% (on OD pulp) of MgSO$_4$ at 70° C. and 20% consistency for 3 hours according to the general procedure E disclosed above to give the TETA-2HALS-reacted, peroxide-bleached TMP, and the control peroxide-bleached TMP. Handsheets of the control, peroxide-bleached TMP and the TETA-2HALS-reacted, peroxide-bleached TMP were prepared from DI H$_2$O according to PAPTAC Test Method, Standard C.5, and from DI H$_2$O containing 0.15 g of CaCl$_2$ per litre of DI H$_2$O. Table 6 shows the PC number and the ISO brightness of the various handsheets vs. the ambient light exposure times. The sheet of TETA-2HALS-reacted and peroxide-bleached TMP shows improved brightness stability over that of the control, peroxide-bleached TMP whether it is prepared from DI H$_2$O or from DI H$_2$O containing calcium ions (Ca$^{2+}$).

TABLE 6

PC Number and ISO Brightness of Various Sheets vs. Light Exposure Time

PC Number (ISO Brightness, %)

| Light exposure time (days) | Sheet of peroxide-bleached TMP made from DI H$_2$O | Sheet of peroxide-bleached TMP made from DI H$_2$O + CaCl$_2$ | Sheet of TETA-2HALS-reacted, peroxide-bleached TMP made from DI H$_2$O | Sheet of TETA-2HALS-reacted, peroxide-bleached TMP made from DI H$_2$O + CaCl$_2$ |
| --- | --- | --- | --- | --- |
| 0  | 0.00 (78.0) | 0.00 (79.0) | 0.00 (76.3) | 0.00 (77.9) |
| 3  | 1.26 (74.5) | 1.17 (75.6) | 0.72 (74.4) | 0.90 (75.3) |
| 5  | 1.84 (73.1) | 1.73 (74.1) | 1.13 (73.4) | 1.31 (74.3) |
| 6  | 2.21 (72.3) | 2.07 (73.3) | 1.35 (72.9) | 1.58 (73.7) |
| 10 | 2.81 (71.0) | 2.59 (72.2) | 1.72 (72.1) | 1.96 (72.8) |
| 12 | 3.30 (70.1) | 3.11 (71.1) | 2.07 (71.4) | 2.36 (71.9) |
| 14 | 3.67 (69.4) | 3.38 (70.5) | 2.31 (70.9) | 2.55 (71.5) |
| 17 | 4.22 (68.4) | 3.92 (69.5) | 2.67 (70.2) | 2.98 (70.6) |
| 19 | 4.58 (67.8) | 4.18 (69.0) | 2.92 (69.7) | 3.24 (70.1) |
| 21 | 4.92 (67.2) | 4.53 (68.4) | 3.15 (69.3) | 3.43 (69.7) |
| 26 | 5.78 (65.8) | 5.27 (67.1) | 3.67 (68.3) | 4.03 (68.6) |
| 28 | 6.16 (65.3) | 5.60 (66.6) | 3.95 (67.8) | 4.31 (68.2) |
| 31 | 6.73 (64.4) | 6.14 (65.8) | 4.37 (67.2) | 4.71 (67.5) |

Example 7

Samples of an aspen BCTMP pulp (ISO brightness=84.1%) were reacted with 0.5% (on pulp) of TETA-2TEMPOH-6HCl synthesized according to the general procedure B disclosed above, at room temperature (~20° C.) and pH 6.5-7.0 for various times, according to the general procedure C disclosed above except that fresh water from a market BCTMP mill was used instead of DI H$_2$O. Table 7 shows the ISO brightness of the various pulps vs. the ambient light exposure times. Reaction of the pulp with TETA-2TEMPOH-6HCl for 10 minutes is as effective as reaction for 2 hours in providing the reacted pulp with improved brightness stability.

4-amino-TEMPOH-2HCl, and with 0.5% (on OD pulp) of TETA-2TEMPOH-6HCl at room temperature (~20° C.) and pH 6.5-7.0 for 2 hours, according to the general procedure C disclosed above except that fresh water from a market BCTMP mill was used instead of DI H$_2$O. Both 4-amino-TEMPOH-2HCl and TETA-2TEMPOH-6HCl were synthesized according to the general procedure B disclosed above. Sheets of the control aspen BCTMP and the inhibitor-reacted pulps were prepared on a Buchner funnel according to TAPPI Test Method T218 sp-02 except that white water from a paper mill instead of DI H$_2$O was used. Table 8 shows the ISO brightness of the various sheets vs. the ambient light exposure times. The sheet of TETA-2TEMPOH-6HCl-re-

TABLE 7

ISO Brightness of Various Pulps vs. Light Exposure Time

ISO Brightness of Various Pulps, %

| Light exposure time (days) | Aspen BCTMP | Reacted with TETA-2TEMPOH-6HCl for 2 h | Reacted with TETA-2TEMPOH-6HCl for 1 h | Reacted with TETA-2TEMPOH-6HCl for 30 min | Reacted with TETA-2TEMPOH-6HCl for 10 min |
| --- | --- | --- | --- | --- | --- |
| 0  | 84.1 | 83.7 | 84.0 | 83.8 | 84.0 |
| 4  | 81.6 | 82.4 | 82.5 | 82.4 | 82.5 |
| 5  | 81.3 | 82.2 | 82.2 | 82.2 | 82.3 |
| 7  | 80.7 | 81.9 | 81.9 | 81.8 | 81.9 |
| 10 | 79.6 | 81.2 | 81.3 | 81.2 | 81.3 |
| 12 | 79.0 | 80.8 | 80.9 | 80.8 | 80.9 |
| 14 | 78.4 | 80.5 | 80.6 | 80.5 | 80.5 |
| 17 | 77.6 | 80.1 | 80.0 | 80.0 | 80.0 |
| 21 | 76.5 | 79.4 | 79.4 | 79.3 | 79.4 |

Example 8

Samples of an aspen BCTMP pulp (ISO brightness=84.2%) were reacted with 0.5% (on OD pulp) of acted pulp made from white water not only shows higher brightness stability than that of the control pulp made from white water, but it also shows higher brightness stability than that of the 4-amino-TEMPOH-2HCl-reacted pulp made from white water.

TABLE 8

ISO Brightness of Various Sheets vs. Light Exposure Time

| Light exposure time (days) | ISO Brightness of Various Sheets, % | | |
|---|---|---|---|
| | Sheet of aspen BCTMP made from white water | Sheet of 4-amino-TEMPOH-2HCl-reacted pulp made from white water | Sheet of TETA-2TEMPOH-6HCl-reacted pulp made from white water |
| 0 | 84.2 | 84.1 | 84.3 |
| 3 | 80.8 | 80.8 | 82.1 |
| 5 | 79.5 | 79.7 | 81.1 |
| 7 | 78.9 | 79.0 | 80.5 |
| 10 | 78.0 | 78.1 | 79.7 |
| 14 | 77.4 | 77.6 | 79.1 |
| 19 | 76.6 | 77.0 | 78.5 |
| 21 | 76.2 | 76.5 | 78.2 |

Example 9

0.620 g of pentaethylenehexamine (abbreviated as PEHA), $NH_2(CH_2CH_2NH)_5H$, instead of triethylenetetramine (TETA) was reacted with 0.681 g of 4-oxo-TEMPO, 1.339 g of sodium triacetoxyborohydride and 0.460 mL of glacial acetic acid according to the general procedure A, and then with 9.0 mL of concentrated hydrochloride in 11.0 mL of EtOH according to the general procedure B to give 0.875 g of the hydrochloride hydroxylamine derivative of the reductive amination product, $C_{28}H_{62}N_8O_2$-8HCl, abbreviated as PEHA-2TEMPOH-8HCl, as an off-white solid. Similar to the reductive amination of 4-oxo-TEMPO with TETA, reaction of 4-oxo-TEMPO with PEHA led to the attachment of two TEMPO molecules to one molecule of PEHA as shown by mass spectrometric analysis of the hydrochloride hydroxylamine derivative of the reductive amination product, $C_{28}H_{62}N_8O_2$-8HCl. MS (ES+): m/z (relative intensity)=543 ($[C_{28}H_{62}N_8O_2]^+$+H-8HCl: 92). Samples of an aspen BCTMP pulp (ISO brightness=83.4%) were reacted at room temperature (~20° C.) and pH 6.5-7.0, according to the general procedure C disclosed above, with 0.5% (on OD pulp) of TETA-2TEMPOH-6HCl, and with 0.5% (on OD pulp) of PEHA-2TEMPOH-8HCl, respectively. Handsheets of the control aspen BCTMP and the inhibitor-reacted pulps were prepared according to PAPTAC Test Method, Standard C.5 except that diluted white water from a paper mill was used instead of DI $H_2O$, and that 1.5 g instead of 4.0 g of a pulp was used to make a sheet. Table 9.1 and Table 9.2 show the ISO brightness of the sheets vs. the ambient light exposure times. The sheet of PEHA-2TEMPOH-8HCl-reacted pulp made from the diluted white water not only shows higher brightness stability than that of the control pulp made from the diluted white water, but it also shows higher brightness stability than that of the TETA-2TEMPOH-6HCl-reacted pulp made from the diluted white water.

TABLE 9.1

ISO Brightness of Sheets vs. Light Exposure Time

| Light exposure time (days) | ISO Brightness of Sheets, % | |
|---|---|---|
| | Sheet of aspen BCTMP made from diluted white water | Sheet of TETA-2TEMPOH-6HCl-reacted pulp made from diluted white water |
| 0 | 83.4 | 83.7 |
| 1 | 81.3 | 81.9 |
| 4 | 79.0 | 80.0 |

TABLE 9.1-continued

ISO Brightness of Sheets vs. Light Exposure Time

| Light exposure time (days) | ISO Brightness of Sheets, % | |
|---|---|---|
| | Sheet of aspen BCTMP made from diluted white water | Sheet of TETA-2TEMPOH-6HCl-reacted pulp made from diluted white water |
| 6 | 78.2 | 79.2 |
| 8 | 77.4 | 78.5 |
| 11 | 76.4 | 77.8 |
| 13 | 75.9 | 77.4 |
| 15 | 75.6 | 77.1 |
| 18 | 74.9 | 76.6 |
| 20 | 74.3 | 76.0 |

TABLE 9.2

ISO Brightness of Sheets vs. Light Exposure Time

| Light exposure time (days) | ISO Brightness of Sheets, % | |
|---|---|---|
| | Sheet of aspen BCTMP made from diluted white water | Sheet of PEHA-2TEMPOH-8HCl-reacted pulp made from diluted white water |
| 0 | 83.4 | 83.9 |
| 3 | 79.8 | 81.1 |
| 5 | 78.8 | 80.3 |
| 7 | 78.1 | 79.9 |
| 10 | 77.0 | 79.1 |
| 12 | 76.2 | 78.6 |
| 14 | 75.8 | 78.3 |
| 17 | 74.9 | 77.6 |
| 21 | 73.8 | 76.7 |

Example 10

0.50 g of a branched polyethylenimine (average Mn=600) (abbreviated as b-PEI), $(—NHCH_2CH_2—)_x[—N(CH_2CH_2NH_2) CH_2CH_2—]_y$, instead of TETA was reacted with 0.85 g of 4-oxo-TEMPO, 1.34 g of sodium triacetoxyborohydride and 0.67 mL of glacial acetic according to the general procedure A, and then with 9.0 mL of concentrated hydrochloride in 11.0 mL of EtOH according to the general procedure B to give 1.12 g of the hydrochloride hydroxylamine derivative of the reductive amination product as an off-white solid, abbreviated as b-PEI-iTEMPOH-jHCl. Samples of an aspen BCTMP pulp (ISO brightness=83.4%) were reacted at room temperature (~20° C.) and pH 6.5-7.0, according to the general procedure C disclosed above, with 0.5% (on OD pulp) of TETA-2-TEMPOH-6HCl, and with 0.5% (on OD pulp) of b-PEI-iTEMPOH-jHCl, respectively. Handsheets of the control aspen BCTMP and the inhibitor-reacted pulps were prepared according to PAPTAC Test Method, Standard C.5 except that diluted white water from a paper mill was used instead of DI $H_2O$, and that 1.5 g instead of 4.0 g of a pulp was used to make a sheet. Table 10 shows the ISO brightness of the various sheets vs. the ambient light exposure times. The sheet of the b-PEI-iTEMPOH-jHCl-reacted pulp made from the diluted white water not only shows higher brightness stability than that of the control pulp made from the diluted white water, but it also shows higher brightness stability than that of the TETA-2TEMPOH-6HCl-reacted pulp made from the diluted white water.

TABLE 10

ISO Brightness of Various Sheets vs. Light Exposure Time

| Light exposure time (days) | ISO Brightness of Various Sheets, % | | |
|---|---|---|---|
| | Sheet of aspen BCTMP made from diluted white water | Sheet of TETA-2TEMPOH-6HCl-reacted pulp made from diluted white water | Sheet of b-PEI-iTEMPOH-jHCl-reacted pulp made from diluted white water |
| 0 | 83.4 | 83.7 | 84.2 |
| 1 | 81.3 | 81.9 | 82.5 |
| 4 | 79.0 | 80.0 | 80.7 |
| 6 | 78.2 | 79.2 | 79.9 |
| 8 | 77.4 | 78.5 | 79.4 |
| 11 | 76.4 | 77.8 | 78.6 |
| 13 | 75.9 | 77.4 | 78.3 |
| 15 | 75.6 | 77.1 | 78.1 |
| 18 | 74.9 | 76.6 | 77.6 |
| 20 | 74.3 | 76.0 | 77.1 |

Scheme 1. Structures of TETA-2TEMPO and TETA-2TEMPOH-6HCl.

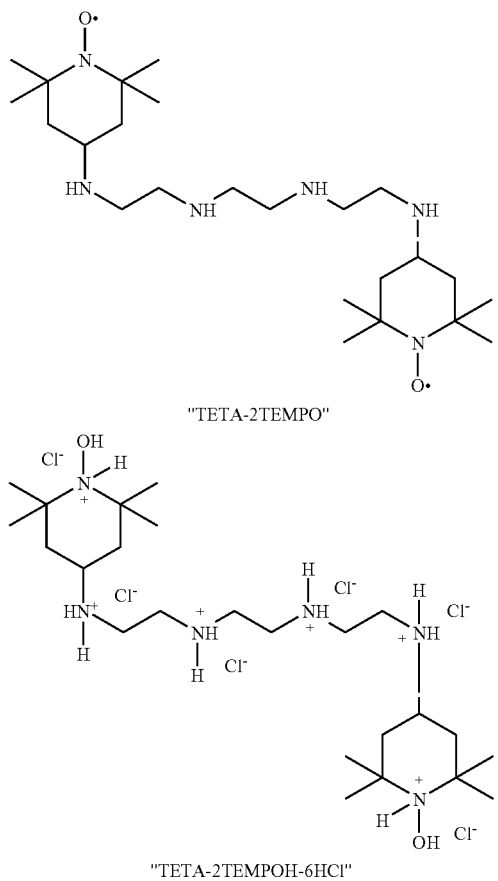

The invention claimed is:

1. A method for the production of light-stable and process-stable lignocellulosic material from a first lignocellulosic material, comprising the reaction of the first lignocellulosic material in an aqueous medium, in an alkaline peroxide bleaching medium, or in an aqueous medium with a subsequent bleaching of reacted material in an alkaline peroxide bleaching medium, with a water-soluble, yellowing inhibitor or hindered amine light stabilizer of the general formula (O):

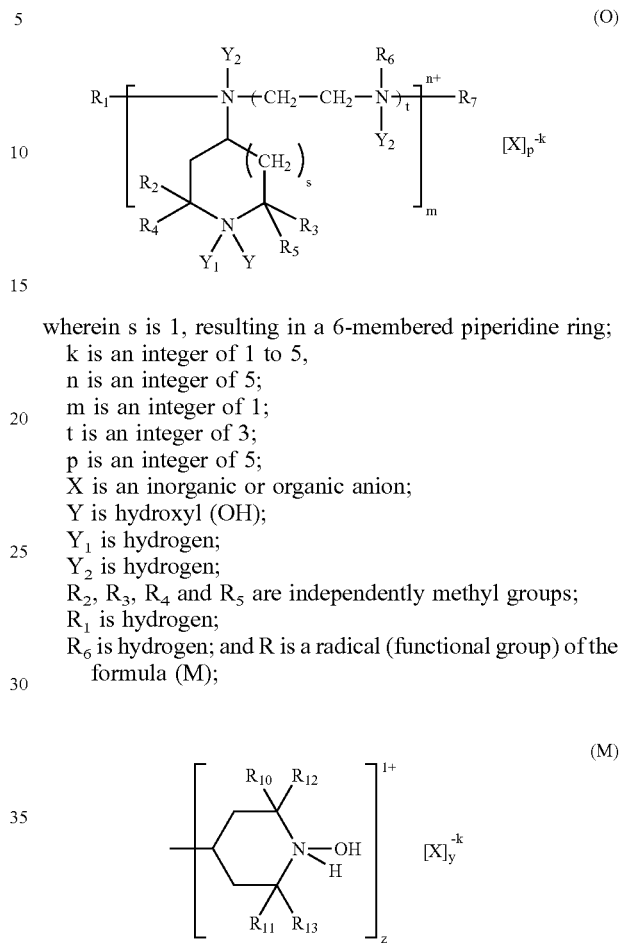

wherein s is 1, resulting in a 6-membered piperidine ring;
k is an integer of 1 to 5,
n is an integer of 5;
m is an integer of 1;
t is an integer of 3;
p is an integer of 5;
X is an inorganic or organic anion;
Y is hydroxyl (OH);
$Y_1$ is hydrogen;
$Y_2$ is hydrogen;
$R_2$, $R_3$, $R_4$ and $R_5$ are independently methyl groups;
$R_1$ is hydrogen;
$R_6$ is hydrogen; and R is a radical (functional group) of the formula (M);

$$\left[ \begin{array}{c} R_{10} \quad R_{12} \\ \phantom{xx} \\ N-OH \\ | \\ H \\ R_{11} \quad R_{13} \end{array} \right]_z^{1+} [X]_y^{-k}$$ (M)

wherein
X is the same as defined above;
k is as defined above,
$R_{10}$, $R_{11}$, $R_{12}$ and $R_{13}$ are independently methyl groups;
y is 1, and
z is 1.

2. A method according to claim 1 wherein said first material is reacted with said yellowing inhibitor in said aqueous medium.

3. A method according to claim 1 wherein said first material is reacted with said stabilizer in said alkaline peroxide bleaching medium.

4. A method according to claim 1 wherein said first material is reacted with said stabilizer in an aqueous mediarn with a subsequent bleaching of the reacted material in said alkaline peroxide bleaching medium.

5. A method aboording to claim 1, wherein said lignocellulosic material is a wood pulp and including steps of forming a paper from the resulting pulp and coating the paper with an ultraviolet absorber.

6. A method according to claim 1, wherein X is selected from carbonate, chloride, bisulfate, sulfate, formate, acetate, citrate, phosphate and ascorbate.

7. A method according to claim 1 wherein the yellowing inhibitor is N-(2,2,6,6-tetramethyl-1-hydroxyl-piperidin-4-yl)-N'-{2-[2-(2,2,6,6-tetramethyl-1-hydroxyl-piperidin-4- ylamino]-ethyl}-ethane-1,2-diamine hexahydrochloride synthesized from the reductive amination of 4-oxo-2,2,6,6-tetramethylpiperidine-N-oxyl with triethylenetetramine in the presence of a reducing agent, followed by reaction with hydrochloric acid in ethanol.

8. A method according to claim 1, wherein the reaction of the lignocellulosic material is conducted with a charge of the yellowing inhibitor or hindered amine light stabilizer of 0.01% to 2.00%, by weight, based on the oven dry weight of the lignocellulosic material.

9. A method according to claim 8 wherein said amount is 0.2% to 1.0%, by weight.

10. A method according to claim 1, wherein the reaction is conducted at a temperature of 20-120° C., a consistency of 0.01% -50%, and a time of 5 seconds to several hours.

11. A method according to claim 1, wherein the reaction in an aqueous medium is conducted at a pH of 3.5-12.5.

12. A method according to claim 1 wherein a reducing agent or an acid is added to the reaction medium.

13. A method according to claim 1, wherein the material is a pulp and the resulting pulp is treated with a reducing agent or an acid.

14. A method according to claim 1, wherein the reaction and/or bleaching is conducted in the presence or absence of air or oxygen.

15. A method according to claim 1, wherein the lignocellulosic material is a mechanical wood pulp and the reaction is carried out in a single-stage or multi-stage in one or more than one refiner, bleach tower, pulp mixer, a storage vessel, or any other reaction vessel suitable for performing the alkaline hydrogen peroxide bleaching of the pulp.

16. A method according to claim 1, wherein the lignocellulosic material is wood chips and at least one of said reaction and bleaching is carried out in a single-stage or multi-stage in one or more than one impregnator.

17. A method according to claim 16 wherein the impregnation of the wood chips is conducted at a temperature of 40-90° C., a solid content of 30-60%, by weight, and an impregnation time of 5 minutes to 2 hours.

18. A method according to claim 1 wherein the lignocellulosic material is a wood pulp and the reaction of said yellowing inhibitor with the pulp is carried out in an agitated tank or any other stock preparation vessels of a paper machine.

19. A method according to claim 1, wherein said reaction is with said water soluble, yellowing inhibitor, and said inhibitor is N-(2,2,6,6-tetramethyl-1-hydroxyl-piperidin-4-yl)-N'-{2-[2-(2,2,6,6-tetramethyl-1-hydroxyl-piperidin-4-ylamino)-ethylamino]-ethyl}-ethane-1,2-diamine hexahydrochloride.

20. A method for the production of light-stable and process-stable lignocellulosic material from a first lignocellulosic material comprising the reaction of the first lignocellulosic material in an aqueous medium, in an alkaline peroxide bleaching medium, or in an aqueous medium with a subsequent bleaching of said first material in an alkaline peroxide bleaching medium, with a water-soluble, yellowing inhibitor or hindered amine light stabilizer of a hexacation of N-(2,2,6,6-tetramethyl-1-hydroxyl-piperidin-4-yl)-N'-{2-[2-(2,2,6,6-tetramethyl-1-hydroxyl-piperidin-4-ylamino)-ethylamino]-ethyl}ethane-1,2-diamine with an inorganic or organic anion.

21. A method according to claim 20, wherein the inorganic or organic anion is selected from carbonate, chloride, bisulfate, sulfate, formats, acetate, citrate, phosphate and ascorbate.

22. A method according to claim 21, wherein the reaction of the lignocellulosic material is conducted with a charge of the yellowing inhibitor or hindered amine light stabilizer of 0.01% to 2.00%, by weight, based on the oven dry weight of the lignocellulosic material.

23. A method according to claim 22, wherein the reaction is conducted at a temperature of 20-120° C., a consistency of 0.01% -50%, and a time of 5 seconds to several hours.

24. A method according to claim 23, wherein the reaction in an aqueous medium is conducted at a pH of 3.5-12.5.

* * * * *